(12) United States Patent
Cherubini et al.

(10) Patent No.: US 12,314,846 B2
(45) Date of Patent: May 27, 2025

(54) ANSWERING COGNITIVE QUERIES FROM SENSOR INPUT SIGNALS

(71) Applicant: International Business Machines Corporation, Armonk, NY (US)

(72) Inventors: Giovanni Cherubini, Rueschlikon (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 16/284,322

(22) Filed: Feb. 25, 2019

(65) Prior Publication Data

US 2020/0272895 A1    Aug. 27, 2020

(51) Int. Cl.
*G06N 3/08*      (2023.01)
*G06F 7/58*      (2006.01)
(Continued)

(52) U.S. Cl.
CPC .............. *G06N 3/08* (2013.01); *G06F 7/582* (2013.01); *G06N 3/04* (2013.01); *G06N 3/045* (2023.01)

(58) Field of Classification Search
CPC .......... G06N 3/08; G06N 3/04; G06N 3/0454; G06N 5/041; G06N 3/084; G06F 7/582
See application file for complete search history.

(56) References Cited

U.S. PATENT DOCUMENTS 7,034,670 B2    4/2006    Kennedy et al.
7,991,714 B2    8/2011    Widrow et al.
(Continued)

FOREIGN PATENT DOCUMENTS

CN    106127301 A    11/2016
CN    107810508 A    3/2018
(Continued)

OTHER PUBLICATIONS

Imani, Mohsen, et al. "Low-power sparse hyperdimensional encoder for language recognition." IEEE Design & Test 34.6 (2017): 94-101. (Year: 2017).*

(Continued)

*Primary Examiner* — Shane D Woolwine
*Assistant Examiner* — Sidney Vincent Bostwick
(74) *Attorney, Agent, or Firm* — Scully, Scott, Murphy & Presser, P.C.; Nicholas Welling

(57) ABSTRACT

A computer-implemented method for answering a cognitive query from sensor input signals may be provided. The method comprises feeding sensor input signals to an input layer of an artificial neural network comprising a plurality of hidden neuron layers and an output neural layer, determining hidden layer output signals from each of the plurality of hidden neuron layers and output signals from the output neural layer, and generating a set of pseudo-random bit sequences by applying a set of mapping functions using the output signals of the output layer and the hidden layer output signals of one of the hidden neuron layers as input data for one mapping function. Furthermore, the method comprises determining a hyper-vector using the set of pseudo-random bit sequences, and storing the hyper-vector in an associative memory, in which a distance between different hyper-vectors is determinable.

25 Claims, 10 Drawing Sheets

(51) Int. Cl.
  *G06N 3/04* (2023.01)
  *G06N 3/045* (2023.01)

(56) References Cited

U.S. PATENT DOCUMENTS

| | | | |
|---|---|---|---|
| 8,521,669 | B2 | 8/2013 | Knoblauch |
| 10,909,450 | B2* | 2/2021 | Chen .................. G06N 3/08 |
| 2015/0120706 | A1 | 4/2015 | Hoffman et al. |
| 2015/0310858 | A1 | 10/2015 | Li et al. |
| 2016/0034811 | A1 | 2/2016 | Paulik et al. |
| 2017/0091615 | A1 | 3/2017 | Liu et al. |
| 2017/0178666 | A1 | 6/2017 | Yu |
| 2018/0089556 | A1 | 3/2018 | Zeiler et al. |
| 2018/0181860 | A1 | 6/2018 | Verbist et al. |
| 2018/0211128 | A1* | 7/2018 | Hotson .............. G06V 10/764 |
| 2018/0232637 | A1 | 8/2018 | Caicedo Fernandez et al. |
| 2018/0253645 | A1 | 9/2018 | Burr |
| 2019/0164056 | A1* | 5/2019 | Hoshizuki ............ H04L 9/008 |

FOREIGN PATENT DOCUMENTS

| | | |
|---|---|---|
| CN | 108604313 A | 9/2018 |
| CN | 108694200 A | 10/2018 |
| JP | 2001052175 A | 2/2001 |
| JP | 2005190429 A | 7/2005 |
| JP | 2018165926 A | 10/2018 |
| JP | 2018536244 A | 12/2018 |
| WO | 2016/206765 A1 | 12/2016 |
| WO | 2017/112466 A1 | 6/2017 |
| WO | 2017096396 A1 | 6/2017 |
| WO | 2018/188240 A1 | 10/2018 |

OTHER PUBLICATIONS

Bernardi, Marcello De, M. H. R. Khouzani, and Pasquale Malacaria. "Pseudo-random number generation using generative adversarial networks." Joint European Conference on Machine Learning and Knowledge Discovery in Databases. Springer, Cham, 2018. (Year: 2018).*

Mukhlason, Ahmad, Ahmad Kamil Mahmood, and Noreen Izza Arshad. "Knowledge Management Driven eLearning System: Developing An Automatic Question Answering System With Expert Locator." Journal of Knowledge Management Practice 9.3 (2008). (Year: 200).*

Neubert, Peer, Stefan Schubert, and Peter Protzel. Learning vector symbolic architectures for reactive robot behaviours. Universitätsbibliothek Chemnitz, 2017. (Year: 2017).*

Das, Abhishek, et al. "Embodied question answering." Proceedings of the IEEE Conference on Computer Vision and Pattern Recognition. 2018. (Year: 2018).*

Imani, Mohsen, et al. "Voicehd: Hyperdimensional computing for efficient speech recognition." 2017 IEEE international conference on rebooting computing (ICRC). IEEE, 2017. (Year: 2017).*

Karras, D. A., and V. Zorkadis. "Overfitting in multilayer perceptrons as a mechanism for (pseudo) random number generation in the design of secure electronic commerce systems." IEEE/AFCEA EUROCOMM 2000. Information Systems for Enhanced Public Safety and Security (Cat. No. 00EX405). IEEE, 2000. (Year: 2000).*

Vakhshiteh, Fatemeh, and Farshad Almasganj. "Exploration of properly combined audiovisual representation with the entropy measure in audiovisual speech recognition." Circuits, Systems, and Signal Processing 38 (2019): 2523-2543. (Year: 2019).*

Amendment submitted to the UK Intellectual Property Office in counterpart UK Patent Application No. 2112651.1 dated Dec. 20, 2021, 6 pages.

Emruli, B., et al., "Analogical Mapping with Sparse Distributed Memory: A Simple Model that Learns to Generalize from Examples", Cognitive Computation, Mar. 2014, pp. 74-88, vol. 6, Issue 1.

Gong, Y., et al., "Compressing Deep Convolutional Networks using Vector Quantization", arXiv:1412.6115 v1, Dec. 18, 2014, 10 pages.

Slomin, N., "The Information Bottleneck: Theory and Applications," Thesis submitted for the degree "Doctor of Philosophy" to the Senate of the Hebrew University, 2002, 157 pages.

Schwartz-Ziv, et al., "Opening the black box of Deep Neural Networks via Information," arXiv:1703.00810v3, Apr. 29, 2017, 19 pages.

Emruli, B., et al., "Analogical mapping and inference with binary spatter codes and sparse distributed memory", The 2013 International Joint Conference on Neural Networks (IJCNN 2013), Aug. 2013, 8 pages.

Kanerva, P., "Computing with 10,000-Bit Words", 2014 52nd Annual Allerton Conference on Communication, Control, and Computing, Sep. 30-Oct. 3, 2014, 8 pages.

International Search Report dated Jun. 4, 2020, issued in PCT/IB2020/051259, 9 pages.

UK Examination Report dated Nov. 5, 2021 issued in GB2112651.1, 7 pages.

Notice of Reasons for Refusal dated Sep. 26, 2023 issued in JP Application No. 2021-547178, 4 pages.

Decision to Grant a Patent dated Jan. 9, 2024 issued in JP Application No. 2021-547178, 5 pages.

* cited by examiner 200 continued from Fig. 1 
| 202 | combining different hyper-vectors stored in the associative memory for deriving the cognitive query and candidate answers |
| 204 | measuring a distance between the cognitive query and the candidate answers |
| 206 | selecting the hyper-vector relating to the candidate answers having a minimum distance |
FIG. 2

FIG. 7A

FIG. 7B struct_1 = r_shape⊗f_shape_1 + r_num⊗f_num_1 + r_pos⊗f_pos_1
struct_2 = r_shape⊗f_shape_1 + r_num⊗f_num_2 + r_pos⊗f_pos_2
struct_3 = r_shape⊗f_shape_1 + r_num⊗f_num_3 + r_pos⊗f_pos_3
struct_4 = r_shape⊗f_shape_2 + r_num⊗f_num_1 + r_pos⊗f_pos_1
struct_5 = r_shape⊗f_shape_2 + r_num⊗f_num_2 + r_pos⊗f_pos_2
struct_6 = r_shape⊗f_shape_2 + r_num⊗f_num_3 + r_pos⊗f_pos_3
struct_7 = r_shape⊗f_shape_3 + r_num⊗f_num_1 + r_pos⊗f_pos_1
struct_8 = r_shape⊗f_shape_3 + r_num⊗f_num_2 + r_pos⊗f_pos_2
query = struct_1⊗struct_2 + struct_2⊗struct_3 + struct_4⊗struct_5
        + struct_5⊗struct_6 + struct_7⊗struct_8
candiate answer = struct_8⊗[r_shape⊗f_shape_x + r_num⊗f_num_x
        + r_pos⊗f_pos_3]
response = [f_shape_3; f_num_3]

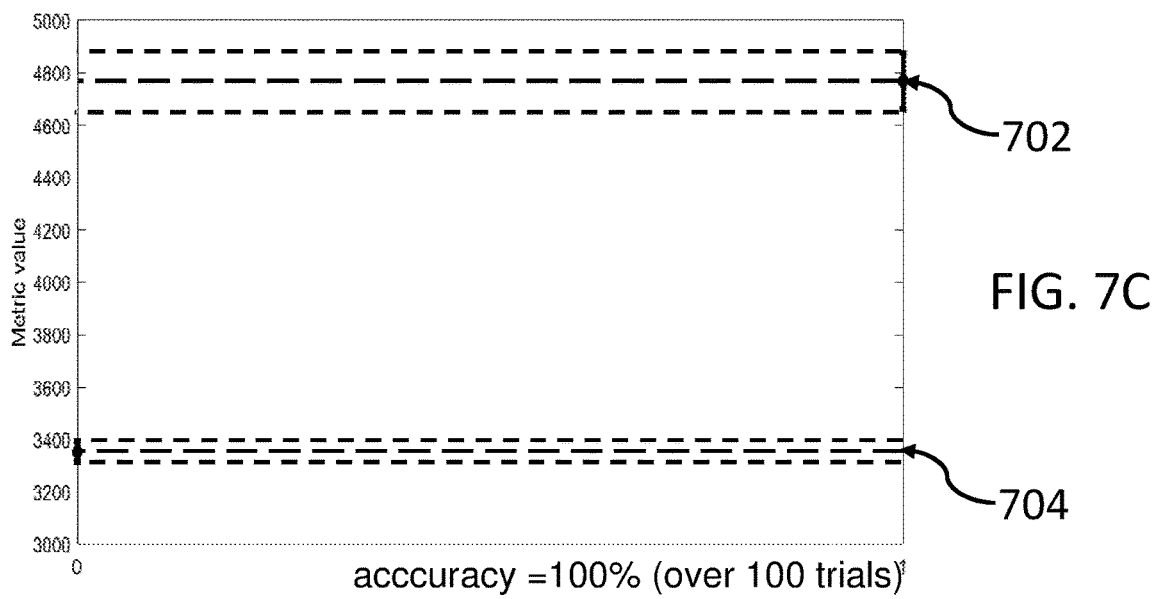

FIG. 7C

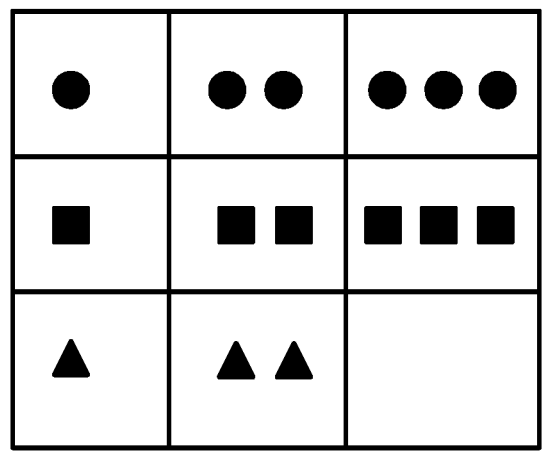
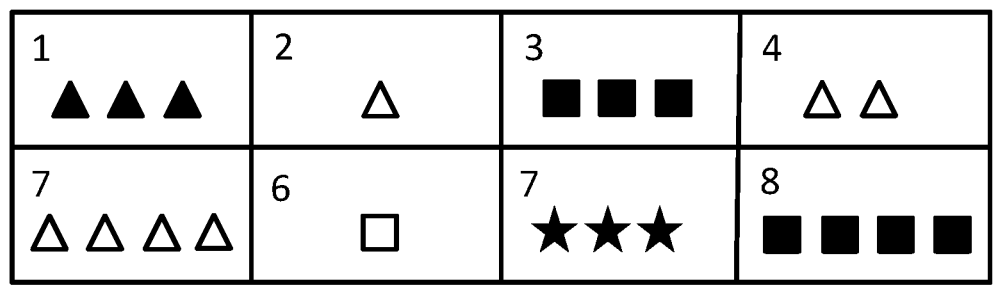
FIG. 10

ANSWERING COGNITIVE QUERIES FROM SENSOR INPUT SIGNALS

BACKGROUND

The present disclosure relates generally to machine-learning, and more specifically, to a computer-implemented method for answering a cognitive query from sensor input signals. The present disclosure relates further to a related machine-learning system for answering a cognitive query from sensor input signals, and a related computer program product.

Machine-learning is one of the hottest topics in science as well as for enterprise information technology (IT) organizations. The vast amount of data collected by enterprises over the last years is ever increasing and needs more and more sophisticated analysis tools. Classical business intelligence/business analytics tools have been proven to be very useful for Information Technology (IT) and business users. However, analyzing semi-structured or unstructured data becomes more and more difficult with a traditional analytics approach.

Storage as well as computing capacities have grown significantly over the last years, enabling a comparably easy implementation of artificial intelligence (AI) systems, either a stand-alone system or integrated into any type of application. These (AI) systems do not need to be programmed in a procedural way but can be trained with example data in order to develop a model in order to, e.g., recognize and/or classify unknown data.

Thus, today, we are still in the age of narrow AI, meaning that AI systems may be enabled to learn and recognize patterns after being trained with training data, however, only within very tight boundaries. The industry is still far away from a general AI which may be able to transfer abstract knowledge from one domain to another domain. Thus, finding analogies between different knowledge domains is one of the challenges imposed on traditional von-Neumann computing architectures.

The ability of an artificial neural system to make analogies and answer cognitive queries depends heavily on the representational capabilities of such a system. Analogies require complex, relational representations of cognitive structures that are not easily obtained by existing artificial neural networks. Vector symbolic architectures are a class of distributed representational schemes that have shown to be able to represent and manipulate cognitive structures.

However, a missing step is the encoding of cognitive structures directly from sensor data, which in the existing literature is widely referred to as the "encoding problem".

The present disclosure in one aspect may increase the capabilities of artificial neural networks, address the information bottleneck and pass, e.g., a well-defined classical intelligence test such as Ravens Progressive Matrices Test.

SUMMARY

According to one aspect of the present invention, a computer-implemented method for answering a cognitive query from sensor input signals may be provided. The method may comprise feeding sensor input signals to an input layer of an artificial neural network comprising a plurality of hidden neuron layers and an output neural layer, determining hidden layer output signals from each of the plurality of hidden neuron layers and output signals from the output neural layer, and generating a set of pseudo-random bit sequences by applying a set of mapping functions using the output signals of the output layer and the hidden layer output signals of one of the hidden neuron layers as input data for one mapping function—in particular, at least one mapping function.

Additionally, the method may comprise determining a hyper-vector using the set of pseudo-random bit sequences, and storing the hyper-vector in an associative memory, in which a distance between different hyper-vectors may be determinable.

According to another aspect of the present invention, a related machine-learning system for answering a cognitive query from sensor input signals may be provided. The machine-learning system may comprise a sensor adapted for feeding sensor input signals to an input layer of an artificial neural network comprising a plurality of hidden neuron layers and an output neural layer, a first determination unit adapted for determining hidden layer output signals from each of the plurality of hidden neuron layers and output signals from the output neural layer, and a generator unit adapted for generating a set of pseudo-random bit sequences by applying a set of mapping functions using the output signals of the output layer and the hidden layer output signals of one of the hidden neuron layers as input data for one mapping function—in particular, at least one mapping function.

The machine-learning system may also comprise a second determination unit adapted for determining a hyper-vector using the set of pseudo-random bit sequences and, a storage module adapted for storing the hyper-vector in an associative memory, in which a distance between different hyper-vectors is determinable.

The proposed computer-implemented method for answering a cognitive query from sensor input signals may offer multiple advantages and technical effects:

The system may enable an elegant way to address the up to now open problem of encoding hyper-dimensional (HD) binary vectors for compositional structures directly from sensor data. This problem is widely referred to as the "encoding problem". The idea is to use information of sensor data from different layers of an artificial neural network to form the HD vectors as input to an associative memory. Thereby, sensor data that may represent elements from the same class may be transformed into information leading to similar binary hyper-vectors. Similarity may mean here: having a relative short distance to each other in the associative memory. These distances may be measured by metric values between a query and potential answers. The closer the HD vectors are to each other, the better a potential answer—selected from the group comprising candidate answers—the shorter the distance may be. The distance may elegantly be measured using the Hamming distance function. The shortest distance between the cognitive query and the candidate answers may be used as the best answer to a given query.

The here proposed solution makes use of the implicit inherent states of a trained artificial neural network in order to derive HD vectors to address the associative memory. Thereby, two different time frames are used. The first time frame may be defined by the end of the training of the neural network. This may be determined by a gradient descent approach applied to the layers of the neural network in order to determine an end of a training session. The generated HD role vectors are only generated once, namely at the end of the training period. They represent the ground state of the neural network that are associated with the compositional representation elements of a cognitive query.

After training, the filler HD vectors may be generated continuously as long as sensor input signals that represent cognitive queries and candidate answers are fed to the system. Each candidate answer may produce at least one HD filler vector to be fed to the associative memory. From the distance between the combined HD role and filler vectors that represent candidate answers, the response to the query may be derived.

Thus, determining an answer for a cognitive query becomes elegantly possible by solving the problem of encoding hyper-dimensional (HD) vectors for compositional structures directly from sensor data.

The proposed non-von-Neumann vector symbolic architecture further allows holistic transformations, that is, the information in the HD vectors gracefully degrades in relation to the number of failing bits, irrespective of their position. Moreover, it adopts efficient HD computing that is characterized by mapping compositional structures onto other compositional structures by simple binary operations, without having to decompose the sensor signal representations into their components.

In the following, additional embodiments of the inventive concept will be described.

According to one embodiment, the method may comprise combining—i.e., using a binding operator and/or bundling operator—different hyper-vectors stored in the associative memory for deriving the cognitive query and candidate answers, each of which is obtained from the sensor input signals. Thus, the processing of the query and the processing of the candidate answers may be achieved in a similar manner which may implicitly make a comparison and a final decision-making process comparably easy.

According to another embodiment, the method may comprise measuring a distance between the hyper-vector representing the cognitive query and the hyper-vectors representing the candidate answers. One option to measure the distance between binary hyper-vectors may be in using the Hamming distance between two binary hyper-vectors. Other vector distance methods may also be implemented successfully. The point is that with a distance function a good comparability may be achieved with controllable compute power. For completeness reasons it may be noted that the term hyper-vector and hyper-dimensional vector may be used interchangeably in this document.

According to one embodiment, the method may also comprise selecting the hyper-vector relating to the candidate answers having a minimum distance from the hyper-vector representing the cognitive query. This comparably straightforward way of selecting an answer for a given cognitive query may represent a pretty elegant way of deriving the best possible answer in the option room of potential answers for a given cognitive query.

According to a further embodiment of the method, the feeding the sensor input data to an input layer of an artificial neural network may also comprise feeding the sensor input data to input layers of a plurality of artificial neural networks. With this additional feature the learning speed and the reliability of the answering process may be increased significantly.

According to one embodiment of the method, the generating a set of pseudo-random bit sequences may also comprise using the output signals of the output layer and the hidden layer output signals of a plurality of the hidden neuron layers as input data for at least one mapping function. Using also the hidden neuron layers and not only the output layer of the neural network, a more complex structure—in particular one of the hyper-vectors—may be generated comparably easy, because the mapping function—which may actually be a plurality of individual mapping functions—may receive also information from intermediate states of the neural network, i.e., from the hidden layers. This may represent a much better fundamental data set for forming the binary HD vectors addressing the associative memory.

According to one permissive embodiment of the method, the neural network may be a convolutional neural network. Convolutional neural networks have proven to be very successful in recognizing (i.e., making predictions about) images or processing sound, e.g., in the form of spoken words. The convolutional stage or stages—typically positioned at the beginning of the sequence of hidden neuron layers—enable a very quick reduction of the number of neurons from one neural network layer to the next layer. Thus, they are instrumental in reducing the compute power requirements for neural networks.

According to one further embodiment, the method may also comprise generating a plurality of random hyper-vectors (HD vectors) as role vectors at an end of a training of the neural network to be stored in the associative memory. The term "at an end" may suggest that the training of the neural network is approaching an end. This end may be determined by a gradient descent approach that relies on the error determined by the difference between results and labels of training data in a supervised training session. Using an SGD (stochastic gradient descent) algorithm and monitoring the gradient statistics may be one option to determine the end of the training session in order to generate the role vectors. A skilled person may know the plurality of other determination methods beside the SDG algorithm in order to determine that the end of the learning session is approaching. A simple determination of a difference of the stochastic gradient variance between two training cycles with two different training data sets and a comparison with a threshold value may trigger the generation of the role vectors.

According to an additional embodiment, the method may also comprise generating continuously a plurality of pseudo-random hyper-vectors as filler vectors based on output data of the plurality of neural networks for each new set of sensor input data, the pseudo-random hyper-vectors to be stored in the associative memory. These pseudo-random vectors may—in contrast to the role vectors—be generated continuously as long as sensor input signals that represent cognitive queries and candidate answers are fed to the related machine-learning system.

According to one embodiment of the method, the combining may comprise binding different hyper-vectors by a vector-element-wise binary XOR operation. Such an operation may represent a compute-power-wise low-cost and highly efficient digital function in order to build a binding between the different hyper-vectors.

According to another and related embodiment of the method, the combining may also comprise a bundling of different hyper-vectors by a vector-element-wise binary average. In contrast to the binding operator $\otimes$, defined as the element-wise binary XOR operation, the bundling operator $<\cdot>$, may be defined as the element-wise binary average of the HD vectors, i.e., the majority rule. Thus, simple binary calculations may be used to define the binding and the bounding of different hyper-vectors, thus requiring only limited compute power.

According to a further embodiment of the method, the role vectors may be stored in the associative memory at the end of a training of the artificial neural network if a stochastic gradient descent value determined between two sets of input vectors of the sensor input signals to the neural network remain below a predefined threshold value. In other words, the difference between adjacent SGD values may be so small that further training efforts may be less and less important. Such method step may also be used to cut down the training data set to a reasonable size in order to keep the training time as short as possible.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
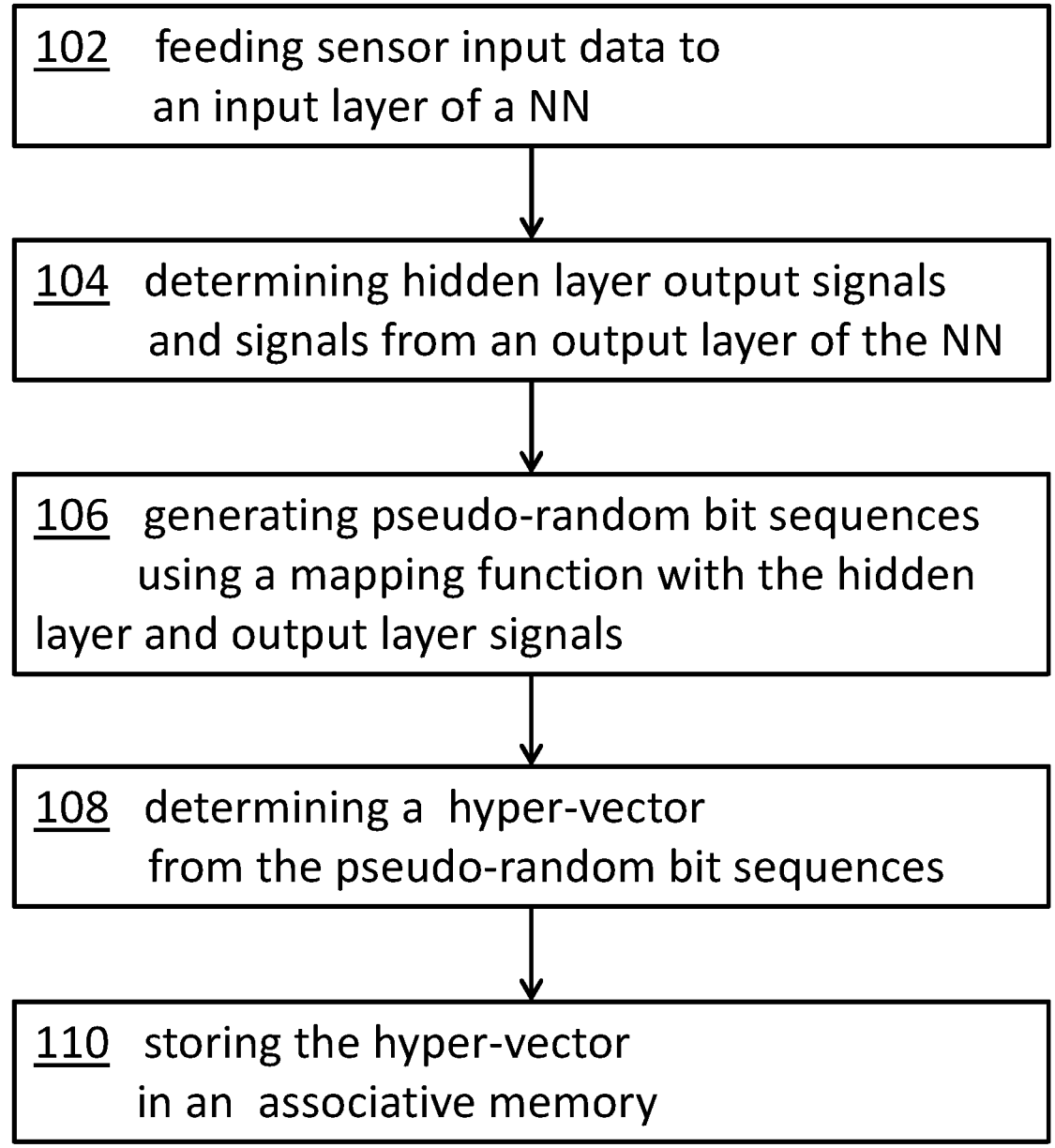

Preferred embodiments of the invention will be described, by way of example only, and with reference to the following drawings:

FIG. 1 shows a block diagram of an embodiment of the inventive computer-implemented method for answering a cognitive query from sensor input signals.

FIG. 2 shows a block diagram of an embodiment of an additional step supporting and extending the method according to FIG. 1.

Figure 3:
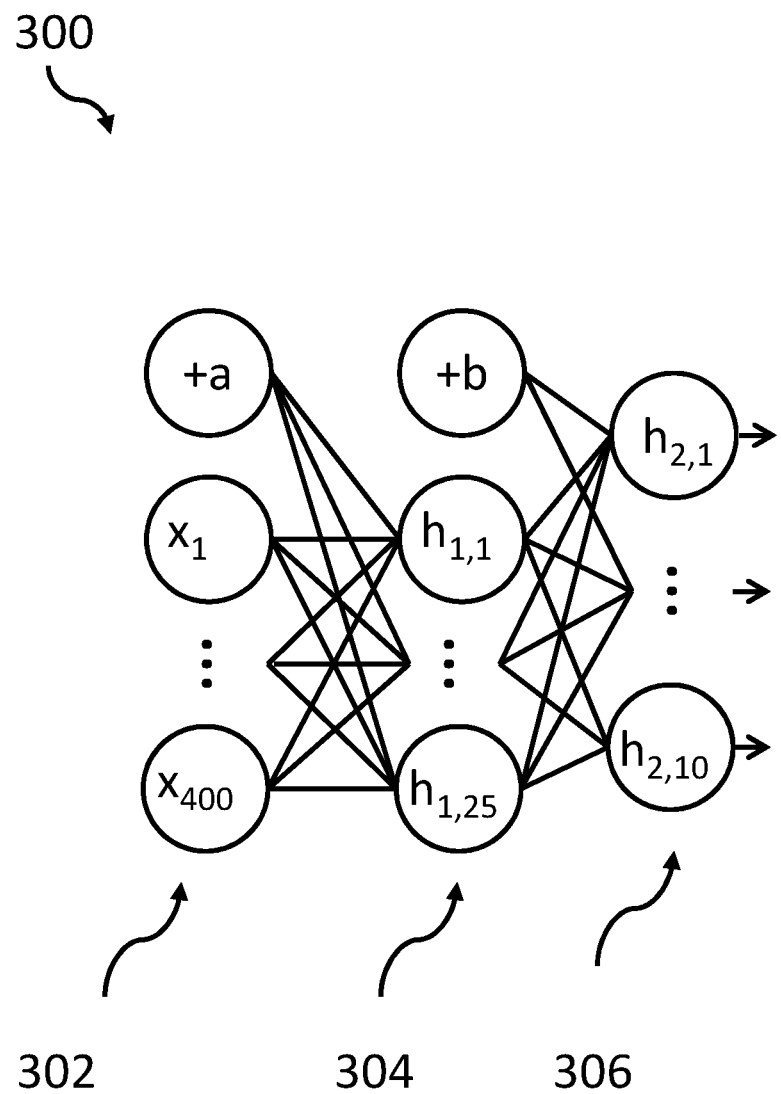

FIG. 3 shows a block diagram of an embodiment of a portion of a neural network.

Figure 4:
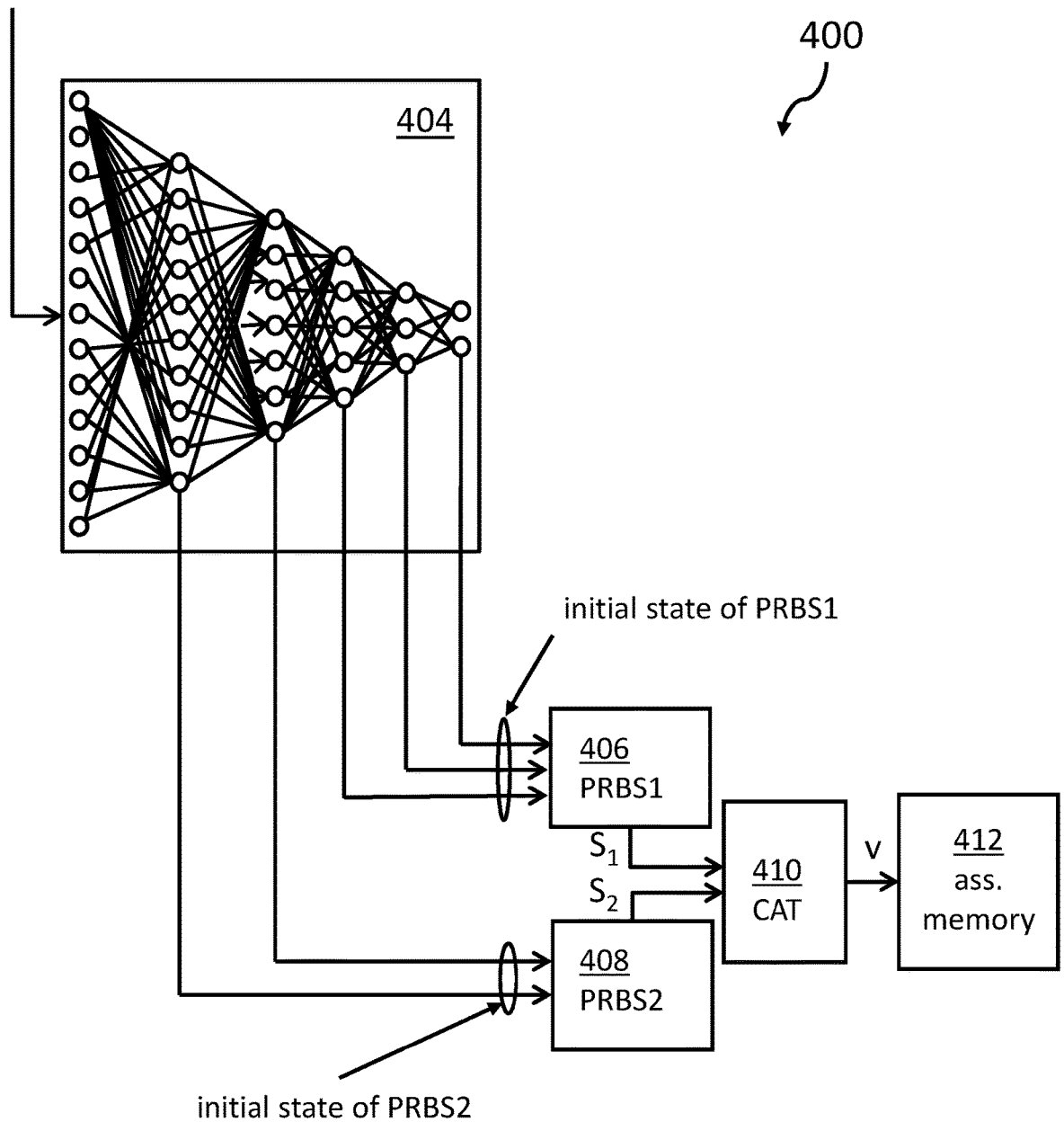

FIG. 4 shows a block diagram of an embodiment of the generally proposed underlying concept.

Figure 5:
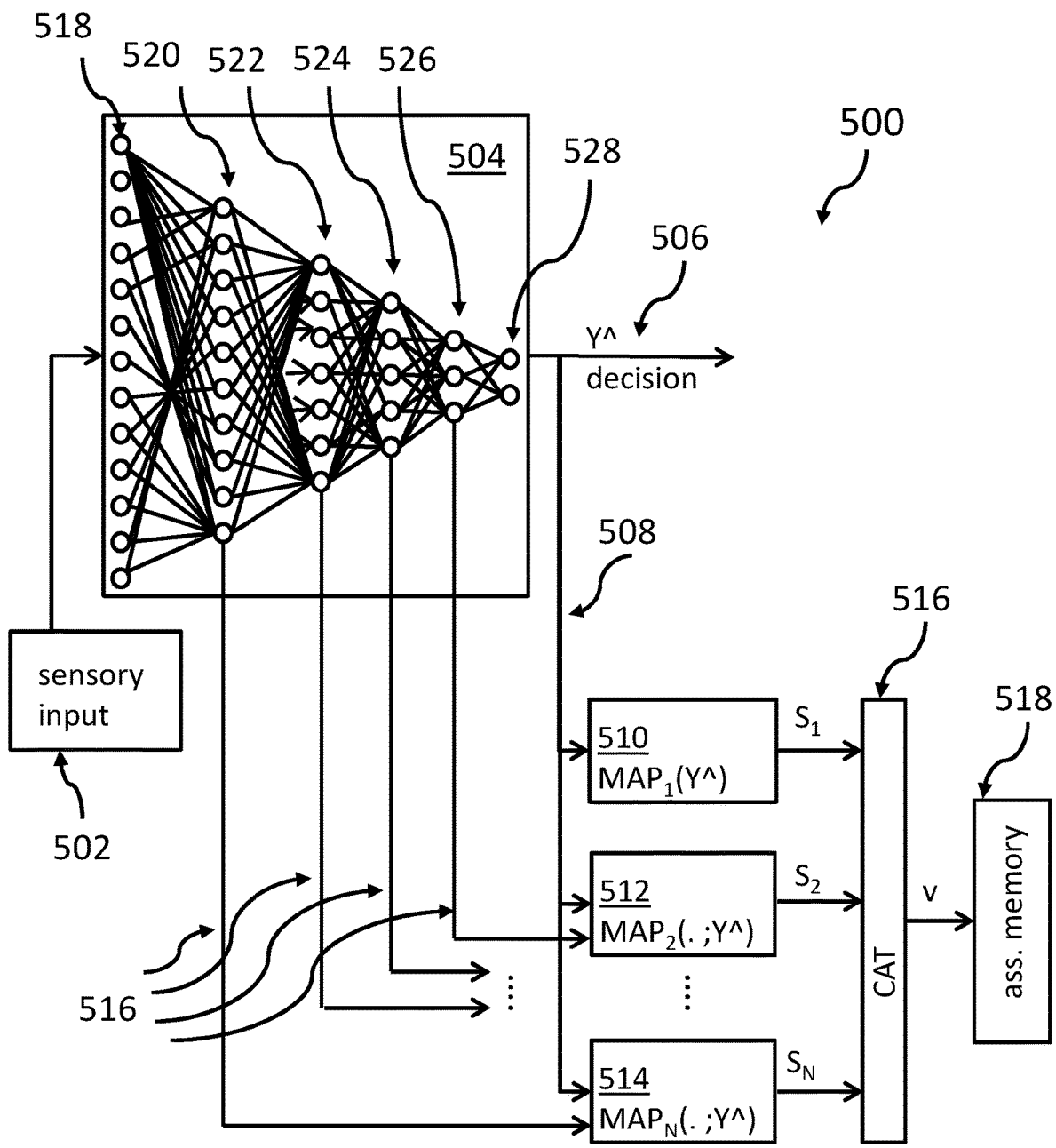

FIG. 5 shows a block diagram of an embodiment of the here proposed concept and more details.

Figure 6:
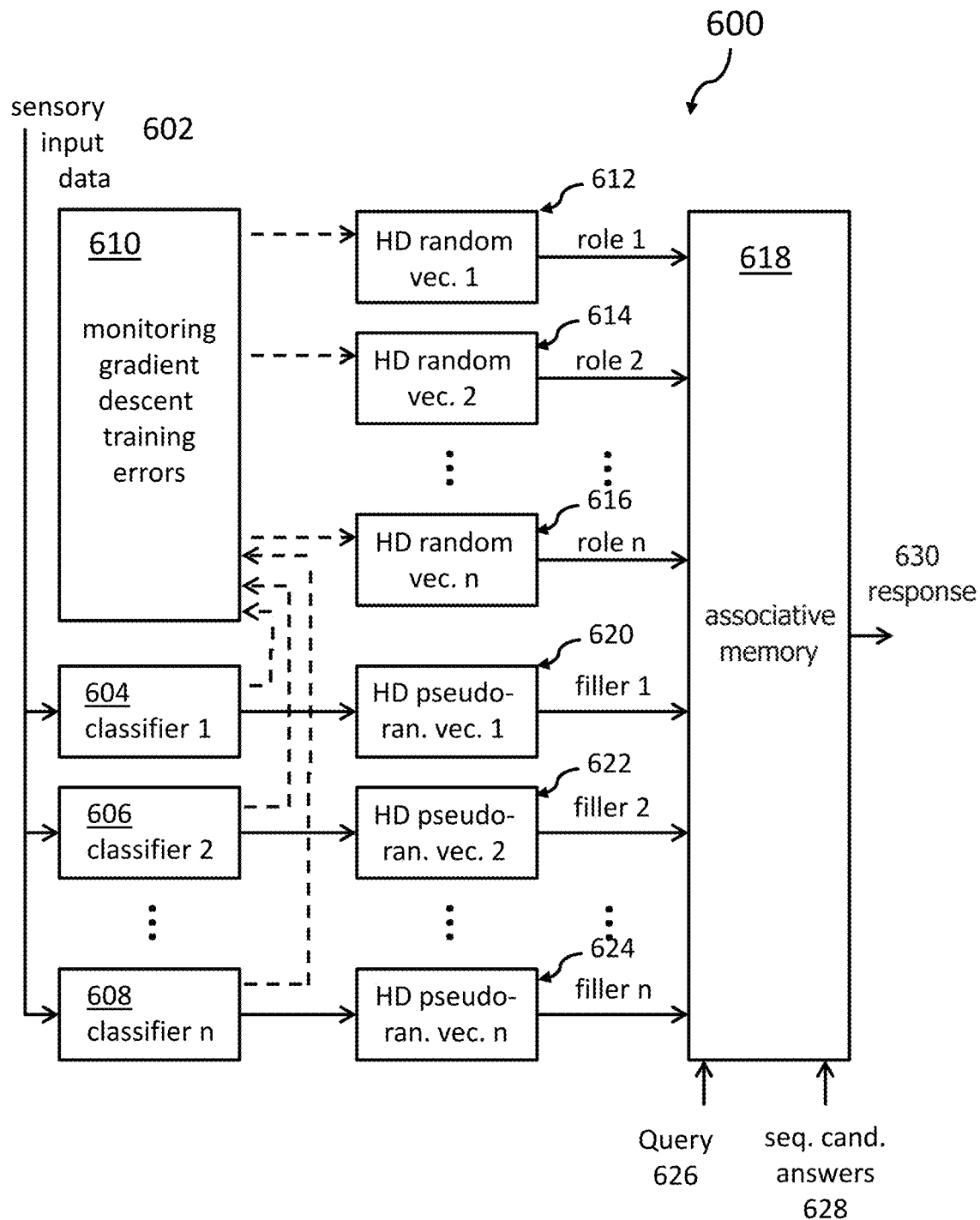

FIG. 6 shows a block diagram of a complete system embodiment of the proposed concept.

FIGS. 7A-7C show an example of the binding and bundling formulas, potential input data as well as a result for a metric value for an average for correct decisions as well as an average for incorrect decisions.

Figure 8:
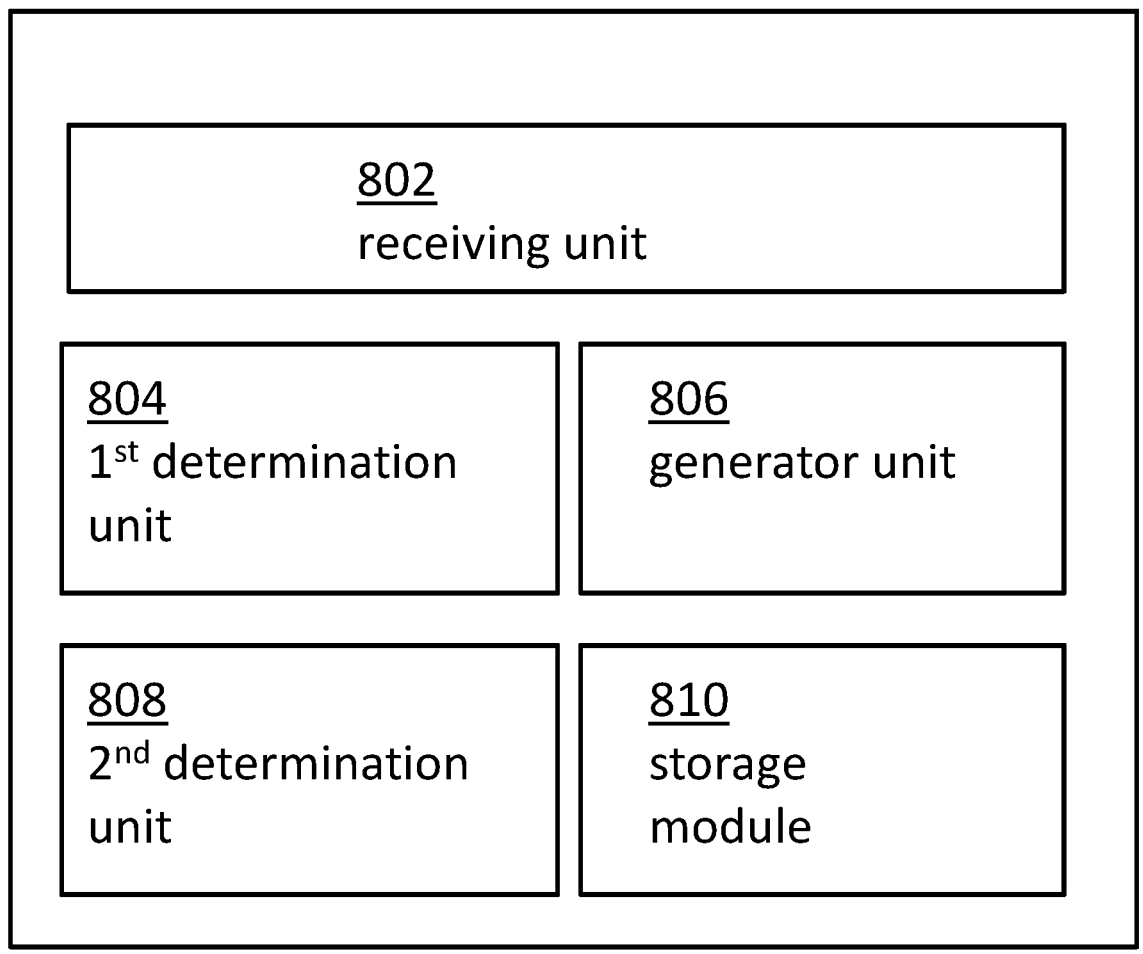

FIG. 8 shows a block diagram of an embodiment of the machine-learning system for answering a cognitive query from sensor input signals.

Figure 9:
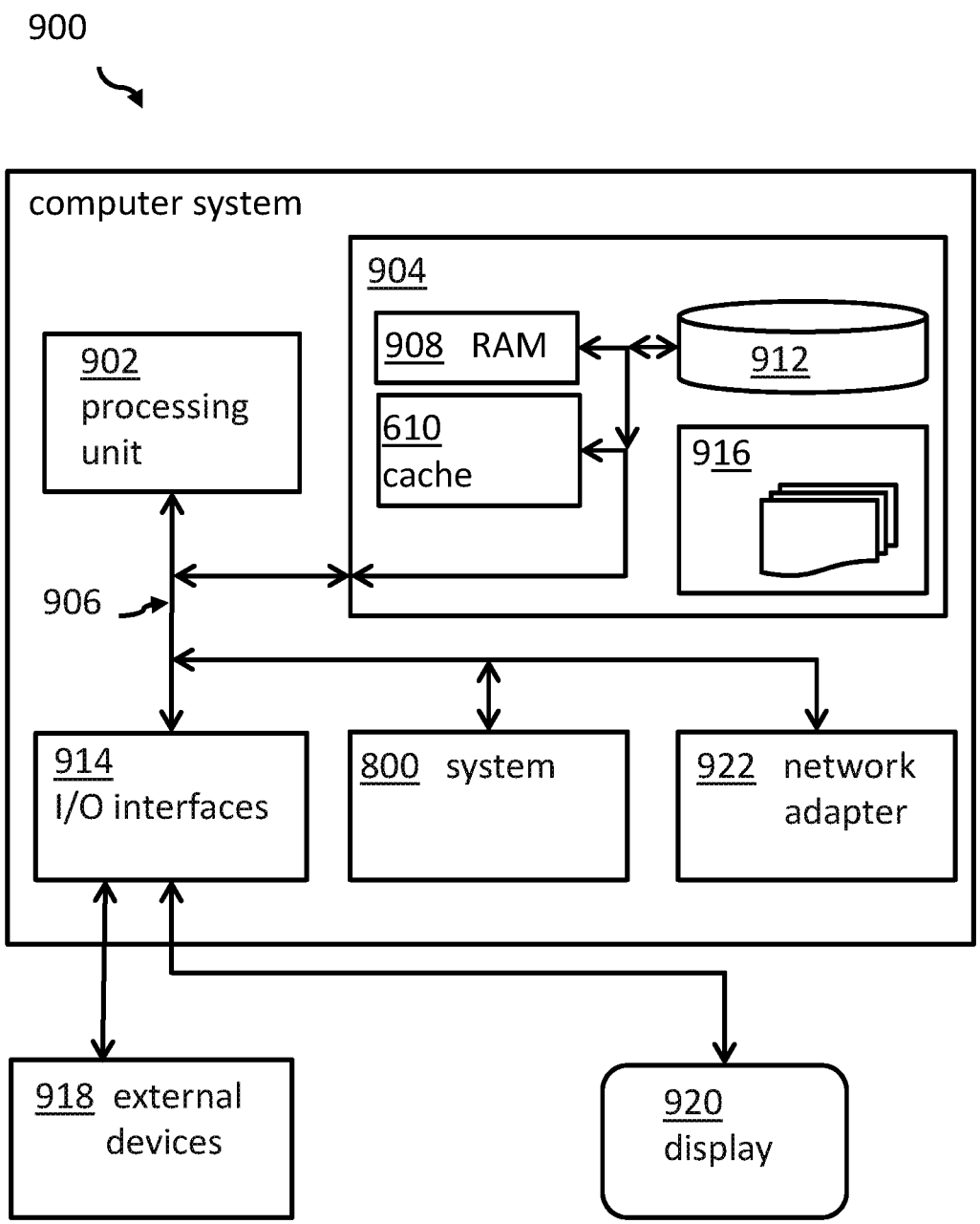

FIG. 9 shows a block diagram of an embodiment of a computing system instrumental for executing portions of the proposed method and/or including the machine-learning system according to FIG. 8.

FIG. 10 shows an example form the Raven's Progressive Matrices test.

DETAILED DESCRIPTION

In the context of this description, the following conventions, terms and/or expressions may be used:

The term 'cognitive query' may denote a query to a machine-learning system which may not be formulated as an SQL (structured query language) statement—or another formal query language—but may be derived directly from sensor input data. A series of candidate answers is tested against the cognitive query using the machine-learning system—i.e., the related method—in order to determine a best possible response within the learned context, i.e., obtaining the required information from the underlying trained neural network (or from more trained neural networks).

The term 'sensor input signal(s)' may denote data directly derived from a sensor for visual data—also recognizable by a human—e.g., image data from an image sensor, like a camera or similar. Alternatively, also sound data may be sensor data from a microphone.

The term 'artificial neural network' (ANN)—or in short neural network (both terms may be used interchangeably throughout this document)—may denote a circuitry or computing systems vaguely inspired by the biological neural networks that constitute human brains. The neural network itself is not an algorithm, but rather a framework for many different machine-learning algorithms to work together and process complex data inputs. Such systems may "learn" to perform tasks by considering examples, generally without being programmed with any task-specific rules, e.g., by automatically generating identifying characteristics from the learning material that is processed.

An ANN is based on a collection of connected units or nodes called artificial neurons and connections, like the synapses in a biological brain, adapted for transmitting a signal from one artificial neuron to another. An artificial neuron that receives a signal may process it and then signal additional artificial neurons connected to it.

In common ANN implementations, the signal at a connection between artificial neurons may be represented by a real number, and the output of each artificial neuron may be computed by some non-linear function of the sum of its inputs (using an activation function). The connections between artificial neurons are usually called 'edges'. Edges connecting artificial neurons typically have a weight that adjusts as learning proceeds. The weight increases or decreases the strength of the signal at a connection. Artificial neurons may have a threshold such that the signal may only be sent if the aggregate signal crosses that threshold. Typically, artificial neurons are aggregated into layers, like input layer, hidden layer(s) and output layer. Signals travel from the first layer (the input layer), to the last layer (the output layer), possibly after traversing the layers multiple times.

The term 'hidden neuron layer(s)' may denote the layer(s) in a neural network not being the input layer or the output layer.

The term 'pseudo-random bit sequence' (PRBS) may denote a binary sequence that, while generated with a deterministic algorithm, may be difficult to predict and exhibits statistical behavior similar to a really random sequence.

The term 'mapping function' may denote here an algorithm used to generate PRBSs from a given input. Typically, the PRBSs generated have—if seen as a vector—a much higher dimensionality than a corresponding input vector.

The term 'hyper-vector' may denote a vector having a large number of dimensions. In the here proposed concept, the dimensionality may be in the range of 10.000. Thus, also the term 'hyper-dimensional vector' (HD vector) may be used interchangeably in this document.

The term 'associative memory' or content-addressable memory (CAM) or associative storage may denote a special type of computer memory used, e.g., in certain very-high-speed searching applications. The associative memory may compare input data (e.g., HD vectors) against stored data, and may return the address of matching data.

Unlike standard computer memory (random access memory or RAM) in which the user supplies a memory address and the RAM returns the data word stored at that address, a CAM is designed such that the user supplies a data word and the CAM searches its entire memory to see if that data word is stored anywhere in it. If the data word or a similar data word (i.e., a data vector) is found, the CAM returns a list of one or more storage addresses where the word was found (and in some architecture implementations, it also returns the contents of that storage address, or other associated pieces of data). In other words, an associative memory may resemble an ordinary computer memory, that is, when an HD vector X is stored using another HD vector A as the address, X may later be retrieved by addressing the associative memory with A. Furthermore, X may also be retrieved by addressing the memory with an HD vector A' that is similar to A.

The term 'distance between different hyper-vectors' may denote a result of a function delivering value denoted as distance. If the hyper-vectors are regarded as strings, then the distance between two (equal length) HD vectors may be equal to the number of positions at which the corresponding symbols in the string are different (Hamming distance). In other words, it may measure the minimum number of substitutions required to change one string into the other, or, alternatively, the minimum number of errors that may transform one string into the other. Consequently, the term 'minimum distance' may denote the shortest distance between a given vector and a group of other vectors.

The term 'candidate answer' may denote one response pattern out of a group of response pattern that may be tested against an input to the machine-learning system denoted as query or cognitive query. The machine-learning system may test each of the candidate answers against the query using the combination of the at least one neural network combined via HD vectors with an associative memory in order to determine the one candidate answer being closest—i.e., having the shortest distance from the query—as the appropriate response.

The term 'role vectors' may denote a set of HD vectors being determined once at an end of the training of the system's neural network. The role vectors may be associated with the compositional representation elements of a cognitive query. They may be generated by using the data from the hidden layers and the output layer as input to a random (or pseudo-random) bit sequence generator to generate random bit sequences that function as role vectors.

The term 'filler vectors' may denote HD vectors having the same dimensionality as the role vectors. The difference to the role vectors is that the filler vectors may continuously be generated during a feeding of the at least one neural network of the machine-learning system with sensor input signals that represent cognitive queries and candidate answers. The filler vectors may be generated as pseudo random bit sequences.

The term 'MNIST database' (Modified National Institute of Standards and Technology database) is a large database of handwritten digits that is commonly used for training various image processing systems. The database is also widely used for training and testing in the field of machine learning. It was created by "re-mixing" the samples from NIST's original datasets. The creators felt that since NIST's training dataset was taken from American Census Bureau employees, while the testing dataset was taken from American high school students, it was not well-suited for machine learning experiments. Furthermore, the black and white images from NIST were normalized to fit into a 28×28 pixel bounding box and anti-aliased, which introduced grayscale levels.

Before going into more details of the embodiments by describing individual embodiments, a short description of more theoretical context should be given, which in parts finds its realization in the embodiments.

Mutual information between random vectors X and T having individual entropies H(X), H(T) and joint entropy H(X,T) may be expressed as $$I(X;T) = \sum_x \sum_t p(x,t) \log \frac{p(x,t)}{p(x)p(t)} = H(X) + H(T) - H(X,T)$$

In the context of the proposed method, it may be assumed that T is a quantized codebook of X, characterized by a conditional distribution p(t|x), inducing a soft partitioning of X. As the cardinality of X increases, the complexity of representing X typically also increases. In order to determine the quality of a compressed representation, a distortion function d(X,T) may be introduced which measures the "distance" between the random variable X and its new representation T. A standard measure for this quantity may be given by the rate of a code with respect to a channel "transmitting" between X and T, i.e., the mutual information, constrained by the maximum allowed average distortion D. The definition of the rate-distortion function may thus be expressed as $$R(D) = \min_{\{p(t|x):\langle d(x,t)\rangle \leq D\}} I(T;X)$$

Finding the rate-distortion function may require solving a minimization problem of a convex function over the convex set of all normalized conditional distributions p(t|x) that may satisfy the distortion constraint. This problem can be solved by introducing a Lagrange multiplier and solving the related minimization task.

Accordingly, the information bottleneck (see above) method with the rate-distortion approach to measure the quality of the compressed representation of X has three drawbacks:
 (i) the distortion measure is part of the problem set up;
 (ii) the choice of the cardinality of the compressed representation T of X is arbitrary; and
 (iii) the notion of the relevance of the information contained in X is completely absent. This may represent the main element in the drawback list.

A solution that may remove all drawbacks may be obtained by the so called information bottleneck method, i.e., by introducing a "relevant" random vector Y, defining the information of interest to a user, and the joint statistics between X and Y, p(x,y). Thus, the problem is formulated as finding a compressed representation T of X that maximize the mutual information between T and Y, I(T; Y). Then, the relevance-compression function for a given joint distribution p(x,y) may be defined as $$\hat{R}(\hat{D}) = \min_{\{p(t|x): I(T;Y) \geq \hat{D}\}} I(T; X)$$

wherein T is conditionally independent of Y given X (Markovian condition) and the minimization is over all the normalized conditional distribution p(t|x) for which the constraint is satisfied.

The relevance-compression function $\hat{R}(\hat{D})$ can now be found by resorting again to a Lagrange multiplier and then minimizing a related function subject to a normalization and assuming the Markovian condition p(t|x,y)=p(t|x).

Now moving to artificial neural networks, the random vectors associated with the different layers of an artificial neural network can be seen as a Markov chain of successive internal representation of the input X. Any representation of T may then be defined through an encoder P(T|X) and a related decoder P($\hat{Y}$|T) and can be quantified by its information plane coordinates $I_x$=I(X; T) and $I_y$=I(T; Y), respectively.

The information bottleneck bound characterizes the optimal representations T which maximally compresses the input X for a given mutual information on the desired output Y.

After a training of a fully connected artificial neural network with actual output $\hat{Y}$, the ratio I(Y; $\hat{Y}$)/I(X; Y) quantifies how much of the relevant information may be captured by the artificial neural network. Thereby, in a fully connected neural network each neuron of a layer within the neural network may be connected, i.e., linked, to each neuron of the next downstream layer of the neural network with a related weighting factor.

Also, the term "encoding problem" may be addressed here: encoding hyper-dimensional (HD) vectors for compositional structures, i.e., encoding cognitive elements as long binary sequences, directly from sensor data has been an open problem so far, widely referred to as the "encoding problem". The here proposed solution is addressing this encoding problem.

Basically, the idea is to use information of sensor data from different layers of an artificial neural network to form the hyper-vector input to an associative memory. Thereby, a conjecture is that sensor data representing cognitive elements from the same class translate into binary information leading to similar hyper-vectors. This may be recognized from the later described FIG. 4.

Now let's turn to the topic of vector symbolic architecture (VSA) which is based on a set of operators on high-dimensional vectors of fixed length, i.e., the mapping vectors, representing a reduced description of a full concept. The fixed-length of the vectors for representations may imply that new compositional structures may be formed from simpler structures without increasing the representation size, however, at the cost of increasing the noise level.

Reduced representations and cognitive models are essentially manipulated with two operators, performing "binding" and "bundling" functions, which for binary vectors are:

(i) the binding operator ⊗, defined as an element-wise binary XOR operation, and
(ii) the bundling operator ⟨ · ⟩, defined as the element-wise binary average.

The concept of mapping vectors may then be combined with a sparse distributed memory (SDM) model of associative memory into an analog mapping unit (AMU) which enables learning of mappings in a simple way. E.g., the concept of "the circle is above the square" can be encoded by the relation ⟨ a+$a_1$⊗●+$a_2$⊗■ ⟩, wherein "a" is the relation name (above), $a_1$ and $a_2$ are roles (variables) of the relation, and the geometric shapes are fillers (values) indicating what is related. The concept of role vectors and filler vectors will later on be described in FIG. 6 later on.

Turning now to sparse distributed memory (SDM): an SDM is a suitable memory for storage of analogical mapping vectors which automatically bundles similar mapping examples into well-organized mapping vectors. Basically, an SDM consists of two parts, a binary address matrix A and an integer content matrix C initialized as follows:

(i) the matrix A is populated randomly with zeros and ones; the rows of A represent address vectors;
(ii) the matrix C is initialized to zero; the rows of C are counter vectors.

With this setup there is a one-to-one link between address vectors and counter vectors, so that an activated address vector is always accompanied by an activated counter vector. Thereby, the address and counter vectors have typically a dimensionality D of about 10,000. The number of address vectors and counter vectors may define the size of the required memory S. The address is then activated if the Hamming distance—expressing the correlation—between a query (query vector) and the address is smaller than a threshold value ϑ, wherein ϑ is approximately equal to 0.1.

It can be shown that the vector symbolic architecture including an AMU can be used to build a system modeling analogy representing a key cognitive function. The AMU including the SDM enables non-commutative binding of compositional structures which makes it possible to predict novel patterns in a given sequence. Such a system may be applied to solve the commonly used intelligence test, called Raven's Progressive Matrices (compare FIG. 10).

When bundling several mapping examples of the type $$M_\Sigma = (●⊗●●+●●⊗●●●+■⊗■■+ \ldots),$$

the compositional structure of the role/filler relations is integrated in the mapping vectors so that it generalizes correctly the new compositional structures $M_\Sigma$⊗▲▲~▲▲▲. The experimental results show clearly that a significantly higher correlation value can be experienced by a symbol representing three triangles than other candidate symbols.

In general, the analogical mapping unit (AMU) consists of an SDM with an additional input/output circuit. Thus, the AMU includes learning and mapping circuits: it learns a mapping of the type $x_k \rightarrow y_k$ from examples and uses bundled mapping vectors stored in the SDM to calculate an output vector $y'_k$.

In the following, bringing it all together, a detailed description of the figures will be given. All instructions in the figures are schematic. Firstly, a block diagram of an embodiment of the inventive computer-implemented method for answering a cognitive query from sensor input signals is given. Afterwards, further embodiments, as well as embodiments of the machine-learning system for answering a cognitive query from sensor input signals, will be described.

FIG. 1 shows a block diagram of an embodiment of the method 100 for answering a cognitive query from sensor input signals. Thereby, a test requires a determination of an answer using analogies. The sensor input data or sensor input signals may be typically regarded as image data, i.e., a rasterized image of a certain resolution. Alternatively, also a sound file (voice, or other sound data) may be used as sensor input data.

The method 100 comprises feeding, 102 sensor input signals to an input layer of an artificial neural network (at least one) comprising a plurality—a minimum would be one—of hidden neuron layers and an output neural layer, determining, 104, hidden layer output signals from each of the plurality of hidden neuron layers and output signals from the output neural layer.

As a next step, the method 100 comprises generating, 106, a set of pseudo-random bit sequences by applying a set of mapping functions using the output signals of the output layer and the hidden layer output signals of at least one or all hidden neuron layers as input data for at least one mapping function. Thereby, one signal per artificial neuron may be used to represent one sub-signal of a layer of the neural network. Thus, each layer of the neural network may represent a signal vector of different dimensionality, depending on the number of artificial neurons in the specific layer.

Furthermore, the method 100 comprises determining, 108, a hyper-vector using the set of pseudo-random bit sequences, e.g., generated or derived by a concatenation of the signal vector source of the artificial neural network, and storing, 110, the hyper-vector(s) in an associative memory, i.e., storing the hyper-vector(s) at a location given by its value, in which a distance between different hyper-vectors is determinable, i.e., measurable, e.g., a Hamming distance value.

FIG. 2 shows a block diagram 200 of an embodiment of a continuation of the flowchart of FIG. 1 representing the method 100. Additional steps may comprise combining, 202, different hyper-vectors stored in the associative memory for deriving the cognitive query and candidate answers, as well as measuring, 204, a distance between the cognitive query and the candidate answers, and finally, selecting, 206, the hyper-vector relating to the candidate answers, i.e., the related hyper vectors, having a minimum distance, e.g., a minimum Hamming distance.

With this setup it is possible to select the candidate answer having the highest probability of being the correct answer in a given set of candidate answers that matches a query, i.e., a cognitive query, under the prerequisite that the relating neural network has been trained with data sets relating to the domain of the query as well as the candidate answers. Thereby, both, the query as well as the candidate answers, are represented by hyper-vectors.

FIG. 3 shows a block diagram of an embodiment of a fraction of a neural network 300. There are 400 neurons $x_1$ to $x_{400}$ of, e.g., a first layer 302 shown, which may be interpreted as input layer. For example, if 400 input neurons can be used, sensor data of an image with 20×20 pixels can be used as input to the neural network 300. The neuron in layer 302 showing the "+a" term may be interpreted as a bias factor for the layer 302. The same may be assumed for "+b" term in the hidden layer 304. The final layer 306 does not comprise a bias factor and may therefore be also interpreted as output layer comprising 10 neurons $h_{2,1}$ to $h_{2,10}$ indicating that the exemplary neural network 300 may be designed to differentiate between 10 different alternatives, i.e., a classification of 10 different input symbols shown on the above-mentioned image.

It may also be noted that the shown exemplary fraction of the neural network 300 shows the concept of a fully connected neural network, i.e., each node of a layer—e.g., layer 302—is connected to each of the neurons of the next downstream layer, here, layer 304. Each such link may have a weighting factor.

FIG. 4 shows a block diagram of an embodiment 400 of the generally proposed underlying concept. Sensor data 402 are fed to an input layer of the neural network 404. From each hidden layer and the output layer of the neural network 404 binary information is fed to the PRBS1 (pseudorandom binary sequence) generator 406 or to the PRBS2 generator 408 to generate sequences $S_1$ and $S_2$. The input signals to the PRBSx generators represent the respective initial states. In case the neural network 404 would be a convolutional neural network, the convolutional step would typically be made between the input layer and the first hidden layer in order to reduce the number of required neurons significantly.

The sequences $S_1$ and $S_2$ may be combined, e.g., concatenated in the CAT unit 410 whose output is the hyper dimensional vector v which is used as input to the associative memory 412. It may also be noted that the input signals from the hidden layers and the output layer of the neural network 404 are also vector data with typically one value, i.e., one dimension, per neuron in their related layer.

FIG. 5 shows a block diagram of an embodiment 500 of the here proposed concept and more details. The sensor data 502 are fed to the neural network 504 as already explained in the context of FIG. 4. The neural network 504 has an input layer 518, hidden layers 520, 522, 524, 526 and an output layer 528 for an indication of the decision 506 $\hat{Y}$ of the neural network 504. It may also be noted here that the number of nodes per neural network layer in the neural network 504 is to be understood as an example; realistic neural networks may have many more artificial neurons per layer, e.g., hundreds or thousands and also many more hidden layers.

As shown, the decision information 506 $\hat{Y}$ is fed via line 508 to the mappers $MAP_1$ ($\hat{Y}$) 510, $MAP_2$ (.; $\hat{Y}$) 512 up to $MAP_N$ (.; $\hat{Y}$) 514. Additionally, the vector information derived from the hidden layers 520, 522, 524, 526 of the neural network 504 is used as additional vector inputs to the mappers 510, 512 up to 514. The generated bit sequences $S_1$, $S_2$ up to $S_N$ may then be combined by the concatenation unit CAT 516 to be used in the form of a hyper-vector v as input for the associative memory 518.

The effect used here is that sensor data 502 showing similar patterns may be transformed to hyper-vectors stored in the associative memory that may be relatively close to each other, i.e., having only a short distance to each other, and derived from a distance function between any two hyper-vectors, e.g., using the Hamming distance.

FIG. 6 shows a block diagram of a complete system embodiment 600 of the proposed concept. The sensor data input 602 is fed to a plurality of neural networks shown as classifier 1 604, classifier 2 606 up to classifier n 608. Basically, these classifiers 604, 606, 608 deliver an input signal to a unit 610 for monitoring gradient descent training errors. If a gradient descent value (e.g., SGD—stochastic gradient descent) falls below a predefined threshold value, an end of the training may be signaled leading to a generation of a plurality of hyper-dimensional random vectors 1 to n with dimensionality in the tenths of thousands (e.g., 10.000) by the units 612, 614, 616 building role vectors role 1, role 2 up to role n to be stored in the associative memory 618. This may represent a sort of acknowledgement of training completion of neural networks 604, 606 up to 608.

On the other side, a sequence of filler vectors 1, 2 up to n generated by the hyper-dimensional pseudo-random vector generation units 620, 622, 624 is based on a sequence of input signals from the sensor input data 602. Symbolically, a query input 626 and input values 628 from a sequence of candidate answer inputs are also shown. In any case, a response 630 is generated taking the query 626 as hyper-dimensional vector input and the sequence 628 of candidate answers as a sequence of hyper-dimensional vectors as input. Based on the Hamming distance in the associative memory 618 between the hyper-dimensional vector representing the query 626 and one of the sequence of candidate answers 628—also represented as hyper-dimensional vectors each—the most probably correct HD vector from the sequence of candidate answers 628 builds the response 630 from the candidate answer 628 having the shortest distance to the query 626.

Using this general embodiment, a more concrete embodiment may be used to demonstrate the capability of the here proposed concept. As classifiers, three different types of classifiers are used: a first classifier (e.g., classifier 604) being trained with the MNIST database; as second classifier (e.g., classifier 606) a number classifier may be trained to identify how many digits are seen in a specific field of input data (for an example of input data refer to FIG. 7A; and as third classifier (e.g., classifiers 608) a position counter may be used and able to identify whether one, two or three digits are to be detected.

Out of this, as role vectors an r_shape an r_num and an r_pos HD vector may be generated by the units 612, 614 and 616 to be stored in the associative memory. Furthermore, a sequence of f_shape, f_num and f_pos vectors may be generated from the units 620, 622, 624 also to be fed to the associative memory. A result of a metric value for this setup is shown in FIG. 7C.

FIGS. 7A-7C show the binding and bundling formulas, potential input data as well as results for average metric values for correct decisions as well as of incorrect decisions. As it turns out there is a significant difference between these two alternatives demonstrating the power of the here proposed concept.

FIG. 7A shows a potential input of digits (i.e., integer numbers) 1, 5, 9 in a group of one digit, two digits or three digits, as well as a random pattern an empty input. FIG. 7B shows the related binding and bundling combinations in a set of equations related to the last described embodiment, as well as combinations leading to candidate answers and potential responses. It may also be noted that the binding and bundling functional units may be integrated into the associative memory 618.

FIG. 7C shows the result of such a set up in an x-y-diagram with a metric value shown on the y-axis and the accuracy of 100% (over 100 trials) on the x-axis. It turns out that the average matrix value 702 of incorrect decisions is significantly different to the average metric value 704 for correct decisions. Additionally, the variance for the correct decisions is much smaller.

For completeness reasons, FIG. 8 shows a block diagram of an embodiment of the machine-learning system 800 for answering a cognitive query from sensor input signals. The machine-learning system 800 comprises a sensor 802 adapted for feeding sensor input signals to an input layer of an artificial neural network comprising a plurality of hidden neuron layers and an output neural layer and a first determination unit 804 adapted for determining hidden layer output signals from each of the plurality of hidden neuron layers and output signals from the output neural layer, alongside with a generator unit 806 adapted for generating a set of pseudo-random bit sequences by applying a set of mapping functions using the output signals of the output layer and the hidden layer output signals of one of the hidden neuron layers as input data for one mapping function.

Furthermore, the machine-learning system 800 comprises a second determination unit 808 adapted for determining a hyper-vector using the set of pseudo-random bit sequences, and a storage module 810 adapted for storing the hyper-vector in an associative memory, in which a distance between different hyper-vectors is determinable. As explained above, the Hamming distance may be a good instrument to determine distances between hyper dimensional vectors in the storage module, i.e., the associative memory, as discussed above.

Embodiments of the invention may be implemented together with virtually any type of computer, regardless of the platform being suitable for storing and/or executing program code. FIG. 9 shows, as an example, a computing system 900 suitable for executing program code related to the proposed method.

The computing system 900 is only one example of a suitable computer system, and is not intended to suggest any limitation as to the scope of use or functionality of embodiments of the invention described herein, regardless, whether the computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couple various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

The program/utility, having a set (at least one) of program modules 916, may be stored in memory 904 by way of example, and not limiting, as well as an operating system, one or more application programs, other program modules, and program data. Each of the operating systems, one or more application programs, other program modules, and program data or some combination thereof, may include an implementation of a networking environment. Program modules 916 generally carry out the functions and/or methodologies of embodiments of the invention, as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of the computer system/server 900 via bus 906. It should be understood that, although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, the machine-learning system 800 for answering a cognitive query from sensor input signals may be attached to the bus system 906. The computing system 900 may be used as input/output device.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for answering a cognitive query from sensor input signals, said method comprising:
    feeding sensor input signals to an input layer of an artificial neural network comprising a plurality of hidden neuron layers and an output neural layer;
    determining hidden layer output signals from each of said plurality of hidden neuron layers and output signals from said output neural layer;
    generating a set of pseudo-random bit sequences by applying a plurality of mapping functions by at least feeding said output signals of said output layer and feeding said hidden layer output signals of at least one of said hidden neuron layers directly from said at least one of said hidden neuron layers as input data to one mapping function, the one mapping function receiving the output signals of the output layer and the hidden layer output signals of at least one of the hidden neuron layers additional to receiving the output signals of the output layer, the at least one of the hidden neuron layers including at least one hidden neuron layer other than a hidden neuron layer immediately preceding the output layer, wherein the one mapping function generates at least one pseudo-random bit sequence of the set of pseudo-random bit sequences based on the received output signals of said output layer and intermediate information of the artificial neural network represented by the hidden layer output signals received additionally to the output signals of said output layer, each of the plurality of mapping functions being fed as input, at least one selected from the group consisting of: signals received directly from at least two of the plurality of hidden neuron, and signals received directly from the output neural layer and the at least one of the plurality of hidden neuron layers, wherein each one of the plurality of hidden neuron layers is used in direct feeding in generating the set of pseudo-random bit sequences;

determining a hyper-vector using said set of pseudo-random bit sequences by concatenating the set of pseudo-random bit sequences generated by the plurality of mapping functions; and storing said hyper-vector in an associative memory, in which a distance between different hyper-vectors is determinable.

2. The method according to claim 1, also comprising combining different hyper-vectors stored in said associative memory for deriving said cognitive query and candidate answers, each of which is obtained from said sensor input signals.

3. The method according to claim 2, also comprising measuring a distance between said hyper-vector representing said cognitive query and said hyper-vectors representing said candidate answers.

4. The method according to claim 3, also comprising selecting said hyper-vector relating to said candidate answers having a minimum distance from said hyper-vector representing said cognitive query.

5. The method according to claim 2, wherein said feeding sensor input data to an input layer of an artificial neural network also comprises feeding said sensor input data to input layers of a plurality of artificial neural networks.

6. The method according to claim 1, wherein said generating a set of pseudo-random bit sequences also comprises using said output signals of said output layer and said hidden layer output signals of a plurality of said hidden neuron layers as input data for one mapping function.

7. The method according to claim 1, wherein said neural network is a convolutional neural network.

8. The method according to claim 1, also comprising generating a plurality of random hyper-vectors as role vectors at an end of a training of said neural network to be stored in said associative memory.

9. The method according to claim 5, also comprising generating continuously a plurality of pseudo-random hyper-vectors as filler vectors based on output data of said plurality of neural networks for each new set of sensor input data, said pseudo-random hyper-vectors to be stored in said associative memory.

10. The method according to claim 2, wherein said combining comprises binding different hyper-vectors by a vector-element-wise binary XOR operation.

11. The method according to claim 2, wherein said combining comprises bundling different hyper-vectors by a vector-element-wise binary average.

12. The method according to claim 8, wherein said role vectors are stored in said associative memory at said end of a training of said artificial neural network if a stochastic gradient descent value determined between two sets of input vectors of said sensor input signals to said neural network remain below a predefined threshold value.

13. A machine-learning system for answering a cognitive query from sensor input signals, said machine-learning system comprising:

a sensor adapted for feeding sensor input signals to an input layer of an artificial neural network comprising a plurality of hidden neuron layers and an output neural layer;

at least one computer processor adapted for determining hidden layer output signals from each of said plurality of hidden neuron layers and output signals from said output neural layer;

the at least one computer processor further for generating a set of pseudo-random bit sequences by applying a plurality of mapping functions by at least feeding said output signals of said output layer and feeding said hidden layer output signals of at least one of said hidden neuron layers directly from said at least one of said hidden neuron layers as input data to one mapping function, the one mapping function receiving the output signals of the output layer and the hidden layer output signals of at least one of the hidden neuron layers additional to receiving the output signals of the output layer, the at least one of the hidden neuron layers including at least one hidden neuron layer other than a hidden neuron layer immediately preceding the output layer, wherein the one mapping function generates at least one pseudo-random bit sequence of the set of pseudo-random bit sequences based on the received output signals of said output layer and intermediate information of the artificial neural network represented by the hidden layer output signals received additionally to the output signals of said output layer, each of the plurality of mapping functions being fed as input, at least one selected from the group consisting of: signals received directly from at least two of the plurality of hidden neuron, and signals received directly from the output neural layer and the at least one of the plurality of hidden neuron layers, wherein each one of the plurality of hidden neuron layers is used in direct feeding in generating the set of pseudo-random bit sequences;

the at least one computer processor further adapted for determining a hyper-vector using said set of pseudo-random bit sequences by concatenating the set of pseudo-random bit sequences generated by the plurality of mapping functions; and a storage module adapted for storing said hyper-vector in an associative memory, in which a distance between different hyper-vectors is determinable.

14. The machine-learning system according to claim 13, wherein the at least one computer processor is further for combining different hyper-vectors stored in said associative memory for deriving said cognitive query and candidate answers, each of which is obtained from said sensor input signals.

15. The machine-learning system according to claim 14, wherein the at least one computer processor is further adapted for measuring a distance between said hyper-vector representing said cognitive query and said hyper-vectors representing said candidate answers.

16. The machine-learning system according to claim 15, wherein the at least one computer processor is further adapted for selecting said hyper-vector relating to said candidate answers having a minimum distance from said hyper-vector representing said cognitive query.

17. The machine-learning system according to claim 14, wherein said sensor for feeding sensor input data to an input layer of an artificial neural network is also adapted for feeding said sensor input data to input layers of a plurality of artificial neural networks.

18. The machine-learning system according to claim 13, wherein said generating a set of pseudo-random bit sequences also comprises
  using said output signals of said output layer and said hidden layer output signals of a plurality of said hidden neuron layers as input data for one mapping function.

19. The machine-learning system according to claim 13, wherein said neural network is a convolutional neural network.

20. The machine-learning system according to claim 13, wherein the at least one computer processor is further
  adapted for generating a plurality of random hyper-vectors as role vectors at an end of a training of said neural network to be stored in said associative memory.

21. The machine-learning system according to claim 17, wherein the at least one computer processor is further
  adapted generating continuously a plurality of pseudo-random hyper-vectors as filler vectors based on output data of said plurality of neural networks for each new set of sensor input data, said pseudo-random hyper-vectors to be stored in said associative memory.

22. The machine-learning system according to claim 14, wherein the at least one computer processor is further adapted for
  binding different hyper-vectors by a vector-element-wise binary XOR operation.

23. The machine-learning system according to claim 14, wherein the at least one computer processor is further adapted for
  bundling different hyper-vectors by a vector-element-wise binary average.

24. The machine-learning system according to claim 20, wherein said role vectors are stored in said associative memory at said end of a training of said artificial neural network if a stochastic gradient descent value determined between two sets of input vectors of said sensor input signals to said neural network remain below a predefined threshold value.

25. A computer program product for answering a cognitive query from sensor input signals, said computer program product comprising a computer readable storage medium having program instructions embodied therewith, said program instructions being executable by a computing system to cause the computing system to:

feed sensor input signals to an input layer of an artificial neural network comprising a plurality of hidden neuron layers and an output neural layer;
  determine hidden layer output signals from each of said plurality of hidden neuron layers and output signals from said output neural layer;
  generate a set of pseudo-random bit sequences by applying a plurality of mapping functions by at least feeding said output signals of said output layer and feeding said hidden layer output signals of at least one of said hidden neuron layers directly from said at least one of said hidden neuron layers as input data to one mapping function, the one mapping function receiving the output signals of the output layer and the hidden layer output signals of at least one of the hidden neuron layers additional to receiving the output signals of the output layer, the at least one of the hidden neuron layers including at least one hidden neuron layer other than a hidden neuron layer immediately preceding the output layer, wherein the one mapping function generates at least one pseudo-random bit sequence of the set of pseudo-random bit sequences based on the received output signals of said output layer and intermediate information of the artificial neural network represented by the hidden layer output signals received additionally to the output signals of said output layer, each of the plurality of mapping functions being fed as input, at least one selected from the group consisting of: signals received directly from at least two of the plurality of hidden neuron, and signals received directly from the output neural layer and the at least one of the plurality of hidden neuron layers, wherein each one of the plurality of hidden neuron layers is used in direct feeding in generating the set of pseudo-random bit sequences;
  determine a hyper-vector using said set of pseudo-random bit sequences by concatenating the set of pseudo-random bit sequences generated by the plurality of mapping functions; and
  store said hyper-vector in an associative memory, in which a distance between different hyper-vectors is determinable.

* * * * *